United States Patent [19]
Kurtz

[11] 4,446,479
[45] May 1, 1984

[54] LUMINESCENT DEVICE FOR HIGH RESOLUTION OPTICAL ADDRESS AND LIGHT VALVE IMAGING APPARATUS EMPLOYING SUCH DEVICE

[75] Inventor: Clark N. Kurtz, Rochester, N.Y.

[73] Assignee: Eastman Kodak Company, Rochester, N.Y.

[21] Appl. No.: 392,044

[22] Filed: Jun. 25, 1982

[51] Int. Cl.³ .............................................. H04N 1/46
[52] U.S. Cl. ..................................... 358/75; 358/294; 358/242
[58] Field of Search ................. 358/75, 78, 230, 242, 358/296, 300, 302, 294

[56] References Cited

U.S. PATENT DOCUMENTS

| | | | |
|---|---|---|---|
| 4,357,625 | 11/1982 | Lamberts | 358/75 |
| 4,366,500 | 12/1982 | Kurtz | 358/75 |
| 4,367,946 | 1/1983 | Varner | 358/75 |
| 4,374,397 | 2/1983 | Mir | 358/78 |
| 4,377,753 | 3/1983 | Mir | 350/578 |

Primary Examiner—Michael A. Masinick
Attorney, Agent, or Firm—Raymond L. Owens

[57] ABSTRACT

An optical-address device, useful e.g. in electronic imaging, features (i) a lens array including a plurality of discrete lens means, each adapted to focus incident collimated light, from a plurality of different incidence directions, onto respectively different pixel spots of its associated multi-spot address zone (of a multi-zone, optical-address region) and (ii) a strip of luminescent material with separately stimulatable regions for sequentially illuminating the lens array with collimated light from the different incidence directions. Light valve imaging apparatus incorporating such optical-address also is disclosed.

9 Claims, 6 Drawing Figures

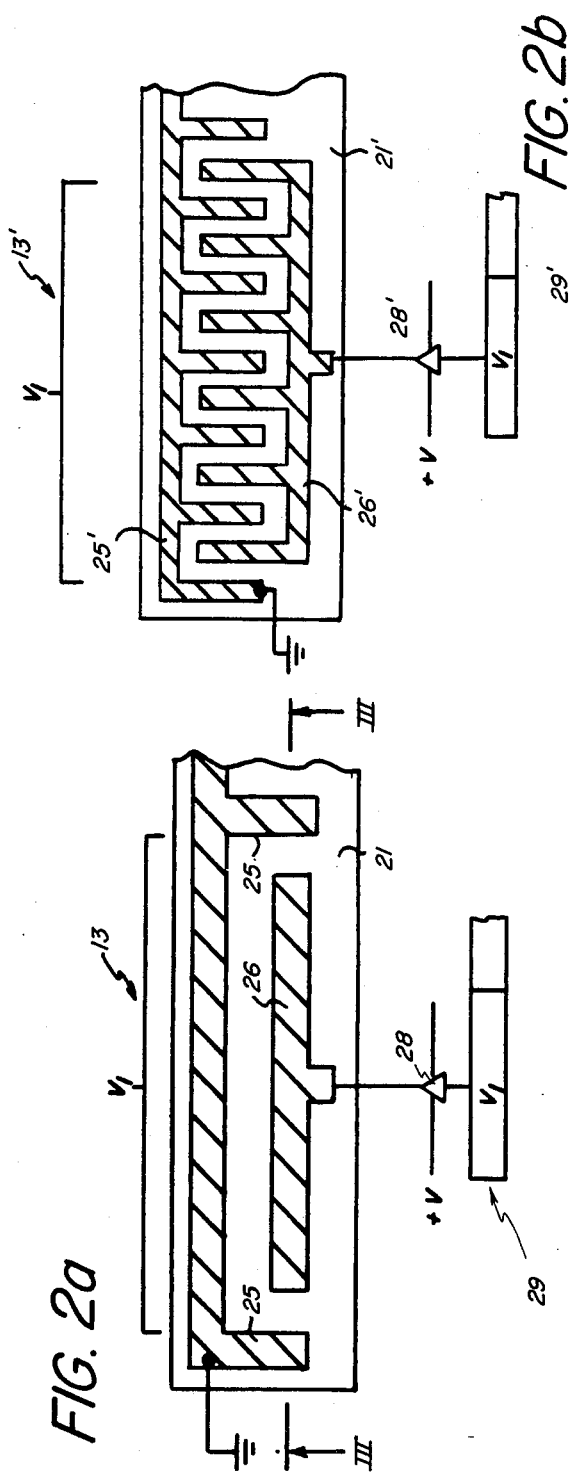
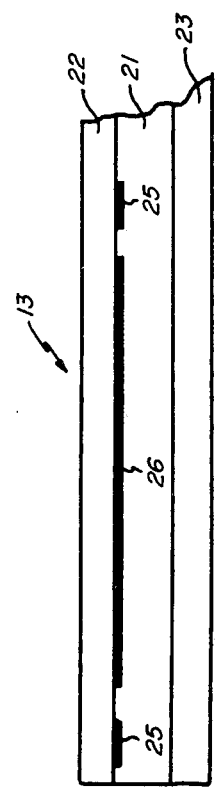
FIG. 2a  FIG. 2b  FIG. 3

LUMINESCENT DEVICE FOR HIGH RESOLUTION OPTICAL ADDRESS AND LIGHT VALVE IMAGING APPARATUS EMPLOYING SUCH DEVICE

BACKGROUND OF THE INVENTION

1. Field of the Invention

The present invention relates to high resolution electro-optical address by means of a luminescent device, and to electronic light valve imaging apparatus employing such address.

2. Description of the Prior Art

Recently, it has been found that light valve array devices provide a highly useful vehicle in electronic imaging. One preferred light valve configuration comprises a piece of ferro-electric ceramic material, such as lanthanum-doped lead zirconate titanate (PLZT), which is sandwiched between crossed polarizers and electrically activatable to operate in a Kerr cell mode. An array of such light valves comprises such crossed polarizers and a panel of PLZT material that has a plurality of electrodes formed on one of its major surfaces. The electrodes are arranged in a manner facilitating the selective application of discrete electrical fields across (in a direction perpendicular to the direction of viewing) discrete surface areas which constitute pixel portions of the panel. Upon application of such fields, the PLZT material becomes birefringent and changes the polarization of the incident light. This results in transmission of light through the PLZT pixels and cooperating polarizers varying as function of the respective addressing fields.

It can be appreciated that light valve arrays must address many image pixels per line in order to form images having even moderate detail. The number of pixels per line increases in accordance with the resolution requirements of the imaging application, e.g. becoming as large as 250 pixels per inch or larger for high quality continuous tone imaging. Because each pixel of the recording medium must be independently addressable with light in accordance with its unique picture content, discretely activatable electrode means are provided for each pixel portion of the light valve array. Each electrode means has had its own high voltage "off-on" switch (e.g. a transistor amplifier), and the cost and complexity of these many switches and their connection and packaging present problems.

One solution to minimize such problems is to provide a smaller number of transversely-spaced pixel portions in the light valve array and then effect multiple passes of the recording medium, with a transverse-indexing of the array (or recording medium) between passes. Thus, if light valve pixel portions are spaced with a three-pixel inter-space and the recording medium is transported past the light valve array four times, only one-fourth the usual number of high-voltage switches is required. However, multiple passes require additional time and can present registration problems.

Another solution, described in U.S. Pat. No. 4,374,397, entitled "Light Valve Devices and Electronic Imaging/Scan Apparatus with Locationally-Interlaced, Optical Addressing", filed June 1, 1981 in the name of J. M. Mir, employs cooperating high and low resolution light valve arrays to effect electronic imaging in an electronically efficient mode. This latter approach is highly advantageous for many applications; however, it is not highly light-efficient. In certain applications this can be a shortcoming.

Another solution, described in U.S. Pat. No. 4,377,753, entitled "High Resolution Optical-Addressing Device and Electronic Scanner and/or Printer Apparatus Employing Such Device" and filed June 1, 1981, in the name of J. M. Mir, provides optical-addressing device having: (i) a linear array of discrete lens elements each adapted to focus collimated light, from different incidence directions, onto respectively different pixel spots and (ii) control means for directing collimated light onto the linear lens array sequentially from the different incidence directions. The optical-addressing device cooperates with a linear light valve array of discrete, light-modulating portions which are each independently addressable to control passage of light and optically aligned with a respective one of the linear array elements.

SUMMARY OF THE INVENTION

The present invention provides highly useful alternative structures for simplified electro-optical address of high resolution pixels. Important advantages of the present invention include its relative structural simplicity and its convenient adaptability to multi-color electronic imaging.

One aspect of the present invention provides improvements in optically addressing apparatus of the kind including (i) a linear array of discrete lens means, each adapted to focus collimated light from different incidence directions onto respectively different pixel spots and (ii) control means for directing collimated light onto the linear lens array sequentially from the different incidence directions. In one embodiment the present invention provides improved control means which include a strip of luminescent material providing a plurality of light emission regions, means for stimulating the luminescent regions sequentially to emit light, and lens means, located between the luminescent strip and the linear lens array, for directing collimated light from the light emission regions onto the linear array from such different incidence directions.

In another aspect the optical address device of the present invention is employed in advantageous cooperation with light valve arrays to provide electronic imaging apparatus.

BRIEF DESCRIPTION OF THE DRAWINGS

The description of preferred embodiments of the present invention refers to the attached drawings wherein:

FIGS. 2a and 2b are plan views of alternative light valve array configurations useful in electronic imaging apparatus embodiments of the present invention;

FIG. 3 is a cross-sectional view taken along the lines III—III of FIG. 2a;

DETAILED DESCRIPTION OF PREFERED EMBODIMENTS

Figure 1:
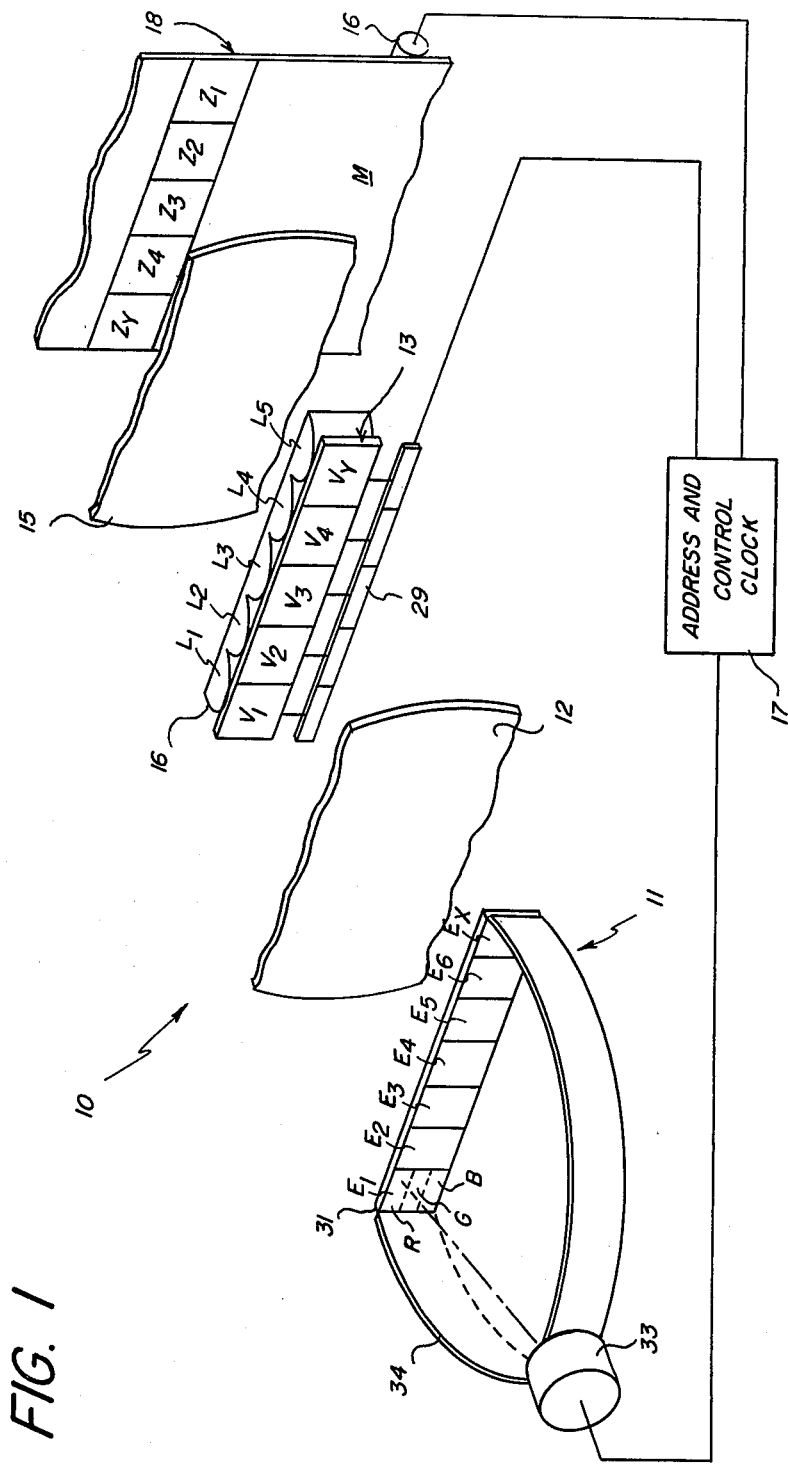
FIG. 1 is a schematic perspective view illustrating one embodiment of optical-address device and electronic imaging apparatus in accordance with the present invention.
Figure 4:
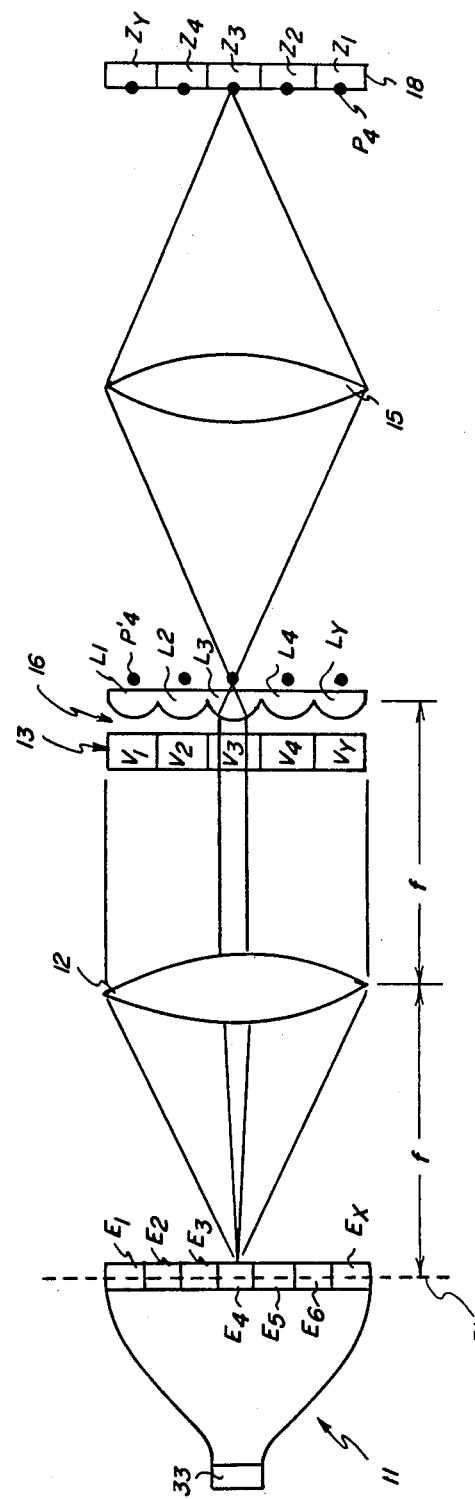
FIG. 4 is a diagrammatic top view of the device and apparatus shown in FIG. 1.

Referring now to FIGS. 1 and 4, the electronic imaging device 10 comprises in general light control means 11 which via lens 12 directs collimated light onto a low resolution light valve array 13 comprising independently addressable portions $V_1$-$V_y$. Light which passes light valve portions $V_1$-$V_y$ of array 13 is imaged (as high resolution spots) at a focal plane of linear lens array 16 which comprises lenslets $L_1$-$L_y$ that are aligned respectively with portions $V_1$-$V_y$ of array 13. Relay lens 15 reimages the light spots focused by lenslets $L_1$-$L_y$ respectively onto corresponding image zone portions $Z_1$-$Z_y$ of the linear exposure station 15. Transport means 16 moves photosensitive media M past the exposure station 18 under the control of address and control logic means 17.

The detailed structure for one preferred embodiment of light valve array 13 is shown in FIGS. 2a and 3. Thus, array 13 comprises an electro-optic panel 21 (e.g. PLZT material) sandwiched between crossed polarizers 22, 23. Grounded electrodes 25 define a plurality of discrete light-modulating portions $V_1$-$V_y$ which are of low resolution (relative to the pixels to be exposed at the exposure station). Each light modulating portion $V_1$-$V_y$ is independently activatable by an electrode 26 which is energizable to a voltage $+V$ by high voltage switch 28 addressed by serial-in, parallel-out shift register 29. An alternative electrode configuration is shown in FIG. 2b wherein corresponding but primed numerals designate functionally equivalent elements to the FIG. 2a embodiment.

As shown best in FIG. 4, lens 12 is of focal length f and located one focal length from the illuminating plane 31 of the illumination control means 11 and one focal length from the lenslet array 16. The illumination control means 11 (FIGS. 1 and 4) includes a plurality of light emission regions $E_1$-$E_x$ which are arranged in a linear array along the illumination plane 31 and are independently stimulatable by stimulating means 33 to emit diffuse light. In one preferred embodiment, the light emission regions comprise electron-beam-stimulatable phosphors of the type used in cathode ray or television tubes. The stimulating means 33 includes an electron beam generator and conventional control devices which, in response to signals from address and control logic 17, deflect the electron beam to scan predetermined emission regions. A vacuum housing 34 encloses the paths of the electron beam to the stimulatable phosphors.

In the FIGS. 1 and 4 configuration the illumination control means 11 and the lens 12, together with logic 17, provide means for directing collimated light uniformly onto light valve array 13 sequentially from a plurality of different directions (corresponding to the different light emission regions $E_1$-$E_x$). The optical addressing device of this embodiment comprises those light directing means in combination with lens array 16 and relay lens 15.

The operation of the optical-addressing device shown in FIGS. 1 and 4 functions under the control of address and control logic means 17. Thus, under the control of logic means 17, stimulating means 33 (beam generator and associated deflection control means) is adapted to sequentially stimulate each of the emission regions $E_1$-$E_x$. As shown in FIG. 4, light from each of the emission regions $E_1$-$E_x$ will emanate toward collimating lens 12 from a different direction. Lens 12 refracts the light from the emission regions $E_1$-$E_x$ to collimate and direct it toward the light valve array 13 and lens array 16. Therefore, the array 16 is sequentially illuminated, via light valve array 13, with a plurality of collimated sheet beams, each from different incidence directions corresponding to the sequential emissions of regions $E_1$-$E_x$ stimulated by means 33.

The result of this optical configuration and operational mode is that each lens element, $L_1$-$L_y$, of array 16 focuses a different light spot for each of the different directions of incident collimated light. During the sequence wherein light is emitted sequentially from emission regions $E_1$-$E_x$, lens array 16 is sequentially illuminated by collimated light from corresponding different directions $D_1$ through $D_x$. This causes sequential sets of focused light spots at the focal plane of array 16, each set including one spot in each of a plurality of multi-spot zones within that focal plane. The zones within the focal plane of array 16 are reimaged by relay lens 15 respectively at zones $X_1$-$Z_y$ of the exposure region 18.

For each direction from which array 16 is illuminated with collimated light, a discrete spot exists within each multi-spot region of the focal plane of array 16 and thus within each zone $Z_1$-$Z_y$. For example, when collimated light of direction $D_4$ (i.e. from emission region $E_4$) is incident on an element of lens array 16, e.g. $L_1$, light is focused by the lens element to a spot $P_4'$ within the multi-spot zone at the focal plane of array 16 and thus at $P_4'$ exposure zone $Z_1$. A similar result is occurring concurrently at each of the $P_4'$ spots of othe zones $Z_2$-$Z_y$. As the electron beam shifts to stimulate emission region $E_5$, pixel $P_5$ of zone $Z_1$ is illuminated by lens $L_1$ (as are pixels $P_5$ of all other zones $Z_2$-$Z_y$ illuminated by lenses $L_2$-$L_y$). It will be appreciated therefore, that in the complete line exposure sequence, sequential stimulation of regions $E_1$-$E_x$, a total of x·y pixels of the exposure region are illuminated in sets, the number of sets corresponding to the number illumination of directions (i.e. number of emission regions $E_x$).

Now consider how the high-resolution optical-addressing device just described can be used in cooperation with low-resolution light valve array 13 to provide improved electronic imaging.

As shown best in FIG. 4, the low-resolution light valve array 13 is located with respect to lens array 16 so that each modulation portion $V_1$-$V_y$ is optically aligned to control light passage to a corresponding lens element of elements $L_1$-$L_y$. It will be noted that light valve array 13 is in front of lens array 16 (with respect to light source 11) to maximize the operative area of the light valve. This enhances inter-light-valve transmission uniformity.

Under the control of logic 17, the light valve portion $V_1$-$V_y$ respectively regulate the light for multi-spot zones $Z_1$-$Z_y$. As described, each light valve portion $V_1$-$V_y$ has a single high-voltage switch 68 that is addressed by shift register 69 in accordance with logic 17 (and the input image signal) to control its energization. Logic 17 includes timing circuitry which regulates the movement of recording medium M past the exposure station to define line exposure periods for successive lines of recording medium M.

One preferred mode of electronic imaging with apparatus 30 shown in FIG. 1, under the control of address and control logic 17, is as follows. During each such line exposure period, logic 17 actuates a plurality of sequential stimulations of emission regions $E_1$-$E_x$. This results in corresponding sequential optical address of pixels $P_1$-$P_x$ of each of multi-spot exposure zones $Z_1$-$Z_y$, during separate sub-periods of the line exposure period. That is, pixels $P_1$ of all zones ($P_1$ set) are optically addressed concurrently, pixels $P_2$ of all zones ($P_2$ set) are optically addressed concurrently, etc.

During each such sub-exposure period the discrete light valve portions $V_1$-$V_y$ of light valve array 13 are addressed with appropriate off-on information for the respective pixel sets ($P_1$ set through $P_x$ set) which have been optically addressed during that sub-period. For example if pixel $P_3$ of zone $Z_1$ is to be exposed for a particular image line, the light valve portion $V_1$ will be energized during the $E_3$ sub-period of line exposure. It will be appreciated that the format of the image signal provided to array 13 is tailored in accordance with the number of lens element $L_y$ and the number of line sub-periods $E_x$. This can be accomplished by appropriate time delay and storage circuitry in logic unit 17. Also, gray scale can be obtained by activating pulse length modulation or modulation of the voltage amplitude of the activating pulse as described in more detail in U.S. Pat. No. 4,229,095.

Referring now again to FIG. 1, there is also illustrated an alternative embodiment of the invention which is highly advantageous for electronic color imaging. Specifically, each emission region $E_1$-$E_x$ comprises separate sub-regions R, G, B (shown only in region $E_1$) which are constructed e.g. of red, green and blue light emitting phosphors. In one embodiment the electron beam sequentially stimulates the respective emission sub-regions, and the signals input to the light valve array 13 sequentially contain red, green and blue image address information. In this embodiment optical means can be provided to merge the imaged positions of the R, G, B sub-region strips of the emission regions or the color information can be formatted with a one line delay between successive colors to avoid optical merging of respective red, green and blue spots.

Figure 5:
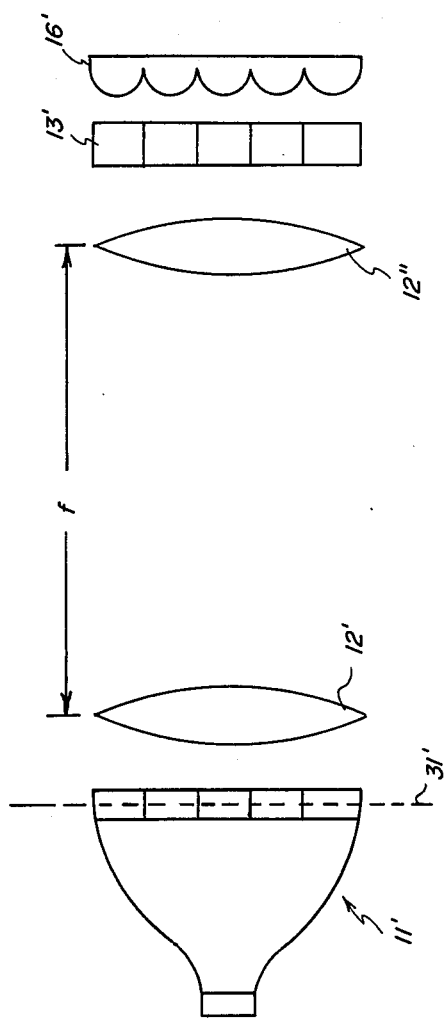
FIG. 5 is a view similar to FIG. 4 but of an alternative embodiment of the present invention.

Another alternative embodiment of the invention is shown in FIG. 5. In this embodiment lens means 12' is located adjacent the emission plane 31' of the cathode ray tube 11' and located a focal length f from supplemental lens 12", likewise of a focal length f. Lens 12" is located adjacent light valve 13' to correct any abberations existing in the collimated light transmitted from lens 12'; however, in some applications lens 12" is not required. This optical system cooperates with light valve array 13', lenslet array 16' and other elements of the FIG. 1 imaging device in the same modes that are described above.

It will be appreciated by one skilled in the art that, if desired, lens 15 can be omitted and the path of the recording medium M modified so that exposure zone 18 lies at the focal plane of lens array 16. Thus, reference herein to address zones of the lens array 16 will be understood to include spaced zones like the FIG. 1 embodiment as well as exposure zones lying at the focal plane of the lens array 16.

The invention has been described in detail with particular reference to certain preferred embodiments thereof, but it will be understood that variations and modifications can be effected within the spirit and scope of the invention.

What is claimed is:

1. In a device for optically addressing a linear, optical-address region, and having (1) a linear array of discrete lens elements, each element adapted to focus incident collimated light from a plurality of different incidence directions respectively onto different pixel spots of its particular multi-spot address zone of the optical-address region; and (2) control means for directing collimated light onto all elements of said linear lens array sequentially from different ones of such plurality of different incidence directions, the improvement wherein said control means comprises:

(a) a strip of luminescent material having discrete light emission regions respectively for each of said different incidence directions;
(b) means for sequentially stimulating said discrete emission regions to emit light; and
(c) lens means, located between said luminescent material strip and said linear array, for collimating light from each of said light emission regions respectively along different directions onto said linear lens, whereby a different pixel spot set, each set including one pixel spot in each of the address zones, is optically addressed in response to each sequential stimulation of said emission regions.

2. The invention defined in claim 1 wherein said luminescent material strip includes "x" discrete light emission regions and said linear array comprises "y" discrete lens elements, whereby x·y pixel spots will be optically addressed in "x" sets by said sequential stimulations of all of said "x" emission regions.

3. In electronic imaging apparatus having: (1) means for transporting successive linear portions of a light-sensitive image medium past a linear exposure region; (2) a linear lens array including a plurality of discrete lens elements each adapted to focus incident collimated light from a plurality of different incidence directions respectively onto different pixel spots of its particular multi-spot exposure zone of the linear exposure region; (3) light control means for directing collimated light onto all elements of said linear lens array sequentially from different ones of such plurality of different incidence directions; and (4) a linear light valve means having a plurality of discrete light valve portions which are each independently addressable to control the passage of incident light and optically aligned with a respective one of said discrete lens elements, the improvement comprising:

(i) a strip of luminescent material having discrete light emission regions respectively for each of said different incidence directions;
(ii) means for sequentially stimulating said discrete emission regions to emit light; and
(iii) lens means, located between said luminescent material strip and said linear lens array, for collimating light from each of said light emission regions respectively along such different directions onto said linear lens array.

4. The invention defined in claim 3 wherein said luminescent material strip includes "x" discrete light emission regions and said linear array comprises "y" discrete lens elements, whereby x·y pixel spots will be optically addressed in "x" sets by said sequential stimulations of all of said "x" emission regions.

5. The invention defined in claims 3 or 4 wherein said light valve means includes address control means for selectively activating the portions of said light valve array in sychronized relation with said stimulating means and according to image information for different respective pixel spot sets of a line of the image to be reproduced.

6. The invention defined in claim 3 or 4 wherein (i) each sequential light stimulation by said stimulating means in cooperation with said lens array enables light exposure of a different pixel spot set, including one pixel spot from each of the different exposure zones, and (ii) said light valve means includes information control means for electrically addressing said light valve portions, in parallel, during sequential sub-periods of a line exposure period, said sub-period addressings being in accordance with image information corresponding to respective pixel spot sets of the image line to be reproduced and in synchronization with said sequential light stimulations.

7. The invention defined in claim 1 or 4 wherein each of said emission regions of said luminescent material strip includes a plurality of discrete areas respectively adapted to emit different color light and wherein said stimulating means is adapted to stimulate each discrete area of each emission region.

8. The invention defined in claim 7 wherein said stimulating means includes means for stimulating each of the discrete areas of a given emission region in parallel.

9. The invention defined in claim 7 wherein said stimulating means includes means for stimulating each of the discrete areas of a given emission region sequentially.

* * * * *